May 11, 1965 O. H. WILLIFORD 3,183,307

MULTICUSTOMER PRIVATE BRANCH EXCHANGE

Filed May 11, 1961 2 Sheets-Sheet 1

INVENTOR
O. H. WILLIFORD
BY Howard R Popper
ATTORNEY

INVENTOR
O. H. WILLIFORD
BY Howard R Popper
ATTORNEY

3,183,307
MULTICUSTOMER PRIVATE BRANCH EXCHANGE

Oscar H. Williford, Bronxville, N.Y., assignor to Bell Telephone Laboratories Incorporated, New York, N.Y., a corporation of New York Filed May 11, 1961, Ser. No. 121,799
17 Claims. (Cl. 179—7)

This invention relates to private branch exchanges and more particularly to apparatus for providing multicustomer operation of private branch exchanges.

In the downtown areas of cities, medium to large size office buildings normally are occupied by a number of different commercial tenants. Each such tenant is normally a telephone customer requiring the use of a number of extension telephone stations located throughout his premises. It has heretofore been the practice to equip such telephone customers with private branch exchanges whereby persons at the various extension stations may, by dialing three of four numbers, obtain a connection to any of the other extension stations belonging to the telephone customer. Each such customer may also be provided with switchboard equipment for supervising the connection of incoming and outgoing toll calls with the extension stations. Separate trunks are normally provided between the central office and each private branch exchange (PBX) customer in the building.

In such buildings at least three different types of telephone calls will be made—calls from one to another of the extension stations belonging to the same PBX customer (intra-PBX calls), local calls outgoing, via PBX automatic dial switching equipment, from any of the extension stations, and toll calls outgoing from an extension station through the customer's PBX operator switchboard. Under existing conditions, calls from an extension station of one PBX customer to an extension station of another PBX customer (inter-PBX calls) are made by dialing the digit 9 to obtain access to one of the customer's central office trunks, waiting for a dial tone, dialing either the directory number of the second customer's PBX switchboard (and upon being connected informing the called customer's switchboard operator as to the extension desired to be reached), or, in the case of some private branch systems, by directly dialing the directory number designation of the desired extension station.

While the foregoing methods of telephone circuit operation are satisfactory for many purposes, they necessitate that at least two central office trunks be utilized whenever a call is made from one to another PBX customer even when the two customers are located in the same building. In addition, these methods require that each PBX customer be provided with separate switching train and control circuit equipment.

Accordingly, it is an object of the present invention to provide improved switching facilities in office buildings among whose tenants some community of interest exists.

It is another object of the present invention to reduce the number of central office trunks required to serve a multicustomer office building.

It is another object of the present invention to provide efficient means for charging calls made between extension stations of a multicustomer private branch exchange.

It is still another object of the present invention to facilitate the charging both of intra-PBX calls as between different customers and outgoing local and toll calls.

In a system which would (without resorting to the use of central office trunks) permit automatic dial switching connections to be established between the extension stations of different telephone customers in the same building, the problem is encountered of properly assessing charges for the previously mentioned different types of calls which could be made. Under usual tariff provisions, a PBX telephone customer is not charged on a per call basis for calls placed between any of the various extension stations of his private branch exchange system. Such a customer pays a flat rental based on the type and size of the system furnished him. On the other hand, the tariff structure may dictate that per call charges are required when calls are made between telephones belonging to different telephone customers. Notwithstanding the foregoing, the latent traffic handling capabilities of certain well known private branch exchange systems (among which may be included the 701 type manufactured by the Western Electric Company) suggest that more than one telephone subscriber might efficiently be served if, inter alia, the charge assessing problems were surmounted.

If a single private branch exchange system were provided in a centralized location, in the very same office building with the telephone customer-tenants for example, not only would be inefficient duplication of switching facilities be eliminated but the wear and tear occasioned by installing and removing individual PBX switching systems as customers changed locations would be obviated.

In accordance with the principles of the present invention, the selective assessment of charges in a multicustomer private branch exchange is provided by obtaining the identity of the customer associated with each of the calling and called extension stations after the called station answers, by comparing the obtained customer identities and by operating the message register of the calling customer when the identity of the calling and called customers is different. On outgoing local calls a return signal from the central office trunk activates the customer identifier at the PBX to select and operate the calling customer's message register, and, on outgoing toll calls, a central office return signal causes the extension station identifier to be directly associated with an outpulser for forwarding to the central office the directory number designation of the calling extension station.

In one embodiment of the invention illustrated in respect to a four digit, seven thousand line, hundred customer PBX, an auxiliary trunk circuit is interposed between each originating line finder and first selector. The auxiliary trunk circuit includes a detector which responds to the called extension station answer to request link circuit access to the extension station and customer identifiers. Upon obtaining access to the identifiers the control of the switching train sleeve circuit is transferred from the switching train terminating connector to the auxiliary trunk circuit and a first identifying potential is applied toward the connector bank sleeve terminal of the call originating extension station. Connector bank terminal identifying relays operate in response to the applied potential to enter the calling station's directory number designation into a PBX customer decoder from which the customer's identity is transferred to a matching register. Thereafter, the auxiliary trunk applies an identifying potential toward the terminating connector bank sleeve terminal of the called extension station operating the connector bank terminal identifying relays thereat. The directory number of the called extension station thereby provided is entered in the PBX customer decoder from which the called customer's identity is thereafter supplied to the matching register. AND gate circuits connecting the digit stages of the two halves of the matching register are enabled when the customer identities stored in the respective halves of the matching register are the same and no charges are made. When the identities do not match, the calling customer's identity designation is transferred to a message register access controller to score the message register associated with extension stations of the calling customer.

According to another aspect of the foregoing illustrative embodiment, outgoing central office trunks are enabled, in response to the central office initiated identification request signals, to share access to the connector bank terminal and PBX customer identifiers with the auxiliary trunk circuits to provide appropriate charging on outgoing local and toll calls.

According to another aspect of the foregoing embodiment, the switch train holding connection normally provided at the terminating connector bank is disconnected and the control of the holding circuit is instead returned through the switching train to the auxiliary trunk circuit where, on calls between extension stations a holding potential is provided which may selectively be reinforced by application of a sequence controlled identifying potential.

It is a feature of the present invention to determine and compare customer identities on calls between extension stations and to charge the calling customer if the called and calling extension stations are not in the same customer's group.

It is another feature of the present invention to compare customer identities by splitting the switching train control connection between calling and called stations and by selectively replacing the holding potential with individual identifying potential.

It is another feature of the present invention to provide connector bank line terminal identifier access selectively either to central office or to local message register charging equipment in accordance with the type of call being made.

It is a further feature of the present invention to obtain message register access by deriving and then translating the directory number designations of the extension stations between which a call is continuing.

It is a still further feature of the present invention to request identification of PBX customers by supplementing the originating switching train with an auxiliary trunk circuit interposed between the originating line finder and selector stages and to return the switch train holding circuit from the called end of the train to the auxiliary trunk circuit.

The foregoing and other features may become more apparent by referring now to the following detailed description together with the drawing, in which—

*General description*

An automatic dial switching private branch exchange system, as it has heretofore been known in the telephone art, typically includes a plurality of extension stations, line finder, selector and connector switches, line and trunk circuits and one or more operator positions. In an office building housing a number of different business tenants who are telephone customers requiring private branch exchange type service it has heretofore been the practice to provide each such tenant-telephone customer with separate line finders, selectors, connectors, line and trunk circuits, etc. none of which could serve any of the other tenants in the building (except of course as they might, from time to time, become involved in switching connections during a call placed through an associated local central office).

However, in accordance with the principles of the present invention, as will hereinafter be described in more intricate detail, extension stations of any of the various tenant-telephone customers may advantageously be connected to the terminal banks of the same line finders and connectors, and these switches, as well as the remainder of the "private" branch exchange equipment, may advantageously be located centrally so as to be equally accessible to each of the customers. In such an arrangement, there obtains what is herein defined to be a "multicustomer private branch exchange" in that calls may be permitted between any of the extension stations served by the common switching system without resorting to the use of central office trunks, and further, appropriate means are provided for assessing charges on such calls when the extensions so involved belong to different telephone customers. All calls placed from one extension to another of the common switching equipment may accordingly aptly be termed "intra-PBX" calls regardless of whether or not they are between extensions belonging to the same customer. On the other hand, calls which actually involve extension stations of different customers served by the common equipment may equally well be termed "inter-PBX" calls inasmuch as they are made between different customers each of whom is furnished PBX service.

*Detailed description—Calls between extension stations*

Figure 1:
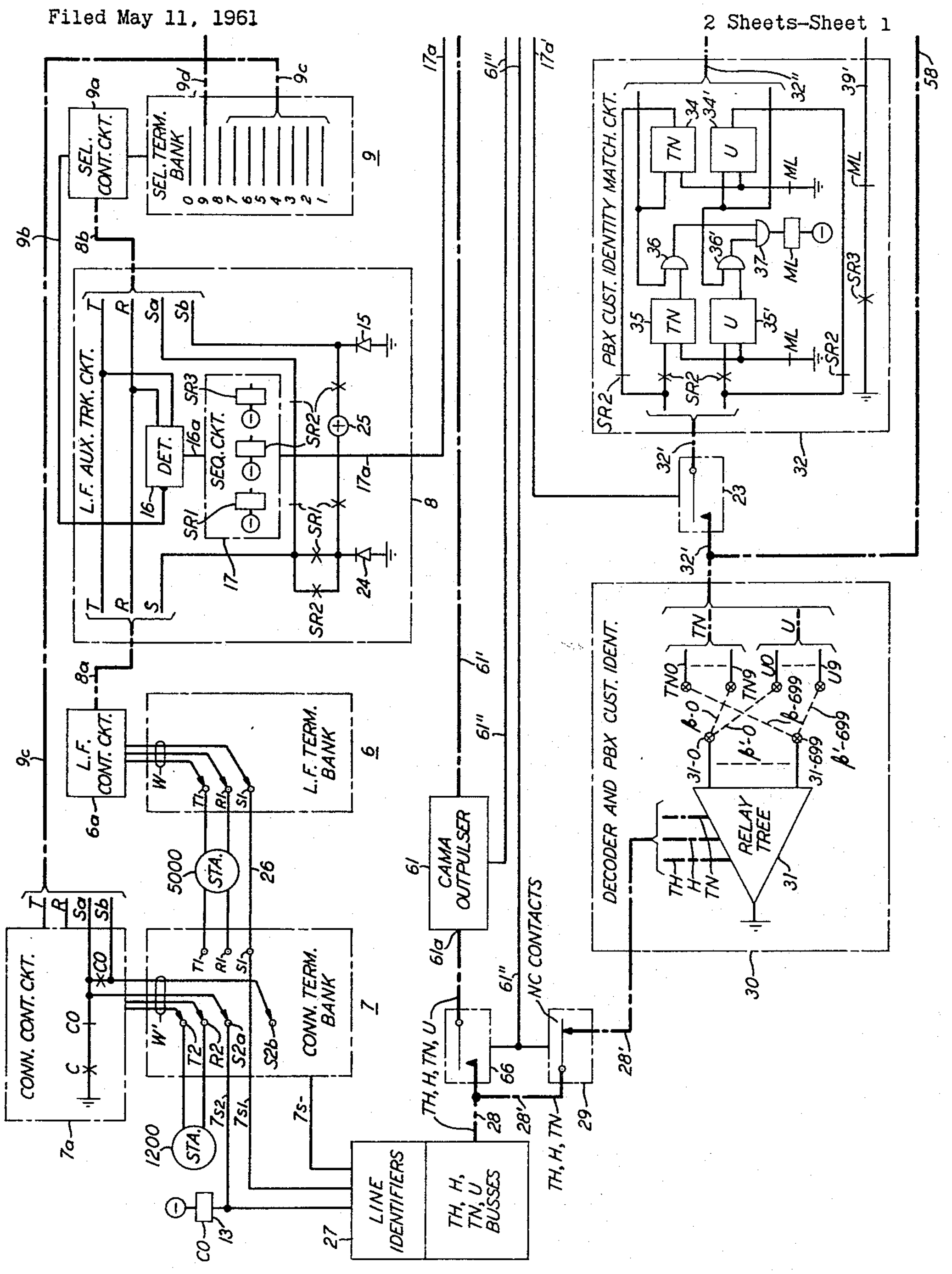
FIG. 1 shows a portion of a private branch exchange system.

Referring now to FIG. 1 a calling extension station 5000 belonging to one of the hundred telephone customers served by the PBX has its tip and ring terminals T1 and R1 appearing among the bank terminals of at least one line finder 6 as well as among the bank terminals of at least one connector 7. In response to the off-hook condition of station 5000, line finder controller circuit 6*a* connects its wipers W to the terminals T1, R1 and S1 in the terminal bank associated with station 5000. Connections from the tip, ring and sleeve terminals are extended from wipers W and cable 8*a* to the left-hand side of line finder auxiliary trunk circuit 8, through circuit 8 to its right-hand side (where the leads are relabeled T, R, and S*a*) and thence, via cable 8*b*, to the first selector control circuit 9*a*. In response to the dialing of the first digit of the called number the first selector circuit 9*a* extends leads T, R and S*a* to a corresponding hunting level in the selector terminal bank. For example, if the digit one is the first digit dialed by station 5000, as it would be for a call to station 1200, leads T, R and S*a* will be extended by the hunting action of first selector control circuit 9*a* to the first idle set of terminals (not shown) on the first level of the terminal bank of selector 9. From the terminal on the selected level of selector 9 the connection may advantageously be extended through other selectors (not shown) and via cable 9*c* to the control circuit 7*a* of a connector 7. The function of lead S*b* in cables 8*b* and 9*c* (and of the corresponding terminal and wiper, not shown, in selector 9) will be hereinafter explained.

Figure 2:
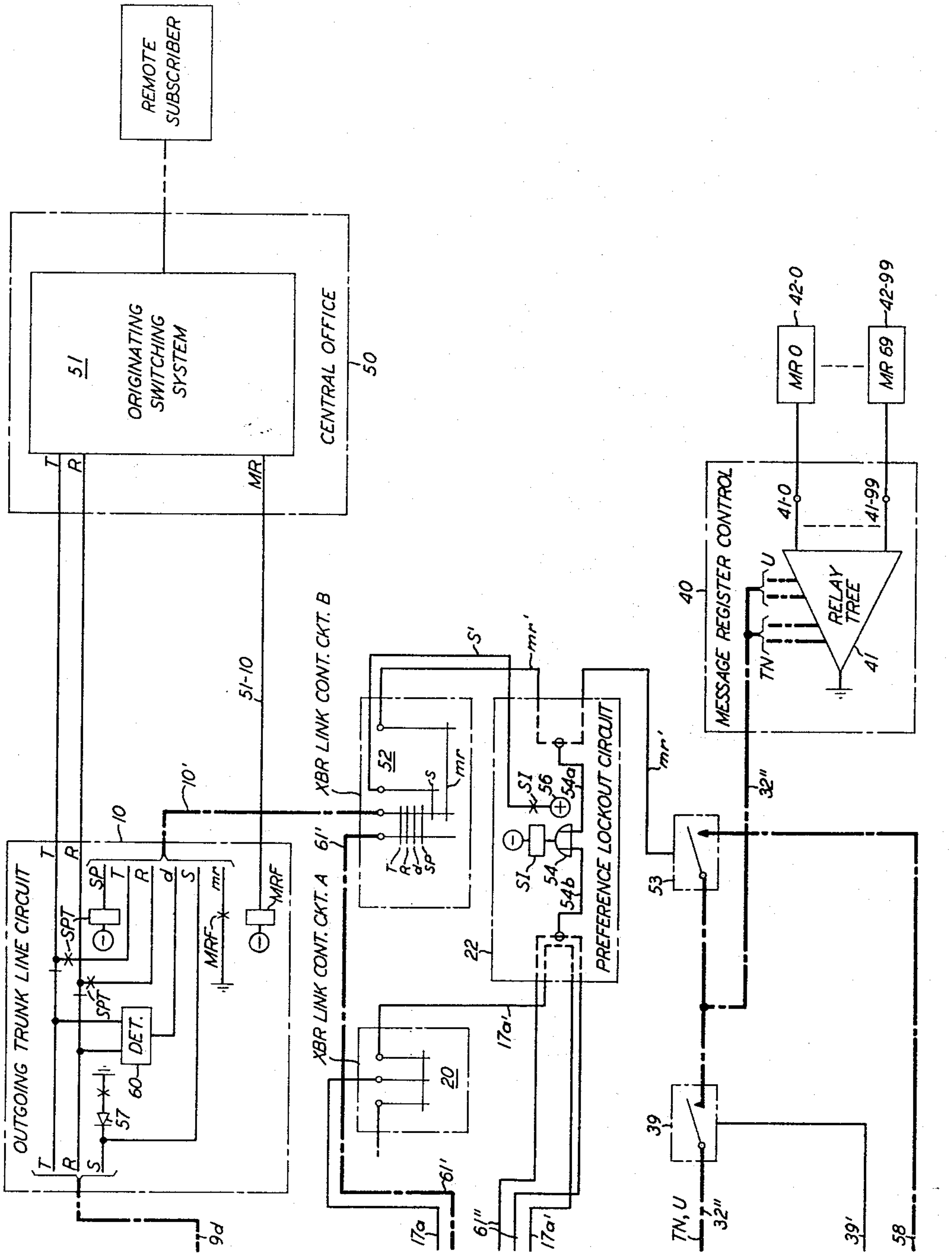
FIG. 2 shows a cooperating portion of the PBX system and the central office to which the PBX is connected.

On the other hand, if the first digit dialed by the calling station 5000 had been the digit nine, the continuity of leads T, R and S*a* would have been extended by control circuit 9*a* to the ninth level of terminals, and thence, via cable 9*d*, to an idle outgoing trunk such as circuit trunk 10 (FIG. 2). Accordingly, station 5000, by dialing appropriate digits may be connected to an outgoing trunk circuit 10 or to a connector control circuit such as circuit 7*a*.

Associated with the selector control circuit 9*a* is a set of normal-post springs, not shown, which are operated whenever the digit dialed by station 5000 causes control circuit 9*a* to extend the connection to any of the eighth, ninth or tenth levels. Such normal-post springs, which are well known in the art and accordingly need not be further described herein, advantageously are used to activate lead 9*b* which connects control circuit 9*a* to auxiliary trunk circuit 8.

Assuming, however, that an intra-PBX call is being made (i.e., a call from one station, such as 5000, to any other extension station, such as 1200, served by the PBX) the continuity of leads T, R and S*a* will be extended, as described above, through cable 9*c* to connector control circuit 7*a*. The last two digits dialed by station 5000 will cause connector control circuit 7*a* to raise and then to rotate its wipers W' associated with the T, R, S*a*, and S*b* leads of cable 9*c* to the T2, R2, S2*a* and S2*b* terminals in the terminal bank of connector 7 that are associated with the called station 1200. The cessation of dial pulsing causes cut-through contacts C of connector control circuit 7a to be made in well-known manner thereby applying switch train holding ground to lead Sa via back contact C0. The cut-off relay 13, associated with the sleeve terminal S2a of the called station 1200, will be operated by the ground applied over lead Sa, and immediately upon operating, at its break contacts removes the switch train holding circuit provided over cut-through contact C and transfers the holding circuit by means of make contact C0 to lead Sb. The holding circuit is continued back along lead Sb in cable 9c and the terminal bank connections (not shown) priorly established in selector 9, through selector control current 9a and cable 8b to the right-hand side of auxiliary trunk circuit 8.

Diode 15 of circuit 8 is connected between ground and lead Sb to maintain the switch train holding ground applied to lead thereby keeping cut-off relay 13 operated.

When the party at extension station 1200 removes his receiver from the switchhook, connector control circuit 7a, in well known manner, reverses the potential appearing between leads T and R of cable 9c, which potential reversal is detected by detector 16 of auxiliary trunk circuit 8. Detector 16 responds to the polarity reversal to activate its output lead 16a connected to sequence circuit 17. Sequence circuit 17, started into operation by the energization of lead 16a, activates leads 17a to link circuit 20 (FIG. 2).

On the other hand, if any of the digits 8, 9, or 0 had been dialed as the first digit of a called number, lead 9b would have been activated by the normal-post springs of selector circuit 9a thereby inhibiting detector 16 from responding to any subsequent polarity reversal occurring between leads T and R during the continuance of the call.

Link circuit 20, which advantageously may comprise any of the crossbar link circuits shown in the book entitled The Design of Switching Circuits by W. Keister, A. E. Ritchie, and S. H. Washburn, in response to the activation of lead 17a (and in the absence of the activation of leads similar to lead 17a from other auxiliary trunk circuits, not shown), energizes lead 17a' connected to preference lock-out circuit 22 and thereby bids for access to the identifier-matching circuits 27, 30 and 32, the control of which circuits is shared in common with the outgoing trunk circuit 10. Assuming that trunk circuit 10 has not requested access to any of the circuits 27, 30 or 32, the continuity of lead 17a' will be completed over its dashed portion within circuit 22 to seize and operate connector 23. Sequence circuit 17 responds (for example by means of a sensitive relay, not shown) to the continuity of lead 17a' when extended to connector 23, to operate sequence relay SR1. Operation of relay SR1 at its break contact opens the connection between sleeve lead S at the left-hand side of circuit 8 and sleeve lead Sa on the right-hand side of circuit 8. Simultaneously therewith, the make contacts of relay SR1 provide both a holding ground path from the cathode of diode 24 and a circuit path from potential source 25 to the S lead at the left-hand side of circuit 8. Application of the positive voltage provided by source 25 causes a positive pulse to be transmitted through lead S of cable 8a and the sleeve lead and wiper of circuit 6a to the sleeve terminal of station 5000 in the line finder terminal bank. The sleeve terminal associated with station 5000 in the line finder terminal bank is connected to a corresponding sleeve terminal in the terminal bank 7 of connector 7 via strap 26.

Each of the sleeve terminals in the terminal bank of connector 7 is connected by means of an individual signaling lead 7s– to line identifier 27. Line identifier 27 is advantageously of the type disclosed in copending application of O. H. Williford, Serial No. 76,325, filed December 16, 1960. As described therein, the line identifier 27 in response to the application of a positive potential to one of the sleeve leads 7s– associated therewith, operates relays to energize a particular pattern of thousands, hundreds, tens and units buses and corresponding leads (not individually shown) in cable 28 indicative of the directory number of the station to whose sleeve terminal the positive potential has been applied.

If the assumption be made that, in a several thousand line private branch exchange, each telephone customer desiring PBX service will be assigned groups of no less than ten extension stations, then of the thousands, hundreds, tens and units in cable 28, only the thousands, hundreds, and tens leads TH, H and TN advantageously need be continued through cable 28' and through the normally closed contacts of connector 29 to decoder and PBX customer identifier 30. Decoder and PBX customer identifier 30 includes relay tree 31, code points 31–0 through 31–699, cross-connection pairs p–0, p'–0 through p–699, p'–699 and cross-connection terminals TN, U 0–9. The energization of a particular one of each of the TH, H and TN leads in cable 28' causes relay tree 31 to extend the ground appearing at its left-hand apex to one of the code points 31–0 through 31–699 appearing at its right-hand side.

While theoretically, any of a thousand such code points (each responsible for ten extension stations) could be selected by the energization of one of each of the TH, H, and TN leads of cable 28', it is assumed that only seven levels of selector 9 may be used for obtaining access to extension stations, the eighth, ninth and tenth levels conventionally being used for tie lines, central office and local switchboard operator use, respectively. Accordingly, only 700 code points, 31–0 through 31–699, are indicated.

When a call is initiated by any of the ten extension stations in a ten station group belonging to the same customer, the same code point will be grounded by relay tree 31. Each code points such as 31–0, is cross-connected by a p–, p'– cross connection pair, such as p–0, p'–0, to the terminus of a particular TN– lead and U– lead of cable 32' to assign the ten station groups to customers. For example, code point 31–0 is cross-connected to lead TN9 and to lead U0 of cable 32' and these leads, upon being grounded, designate a number to identify the PBX customer, one of whose extension stations, such as station 5000, has originated a call. Thus, a particular customer (having a number of ten-station groups, one of which includes station 5000) may conveniently be assigned by means of a corresponding number of cross-connection pairs p–, p'–, any desired number of ten station group code points, as well as, an arbitrary identifying number such as 90, indicated by the activation of leads TN9 and U0 in cable 32'.

The leads of cable 32' are continued through the make contacts of operated connector 23 to PBX customer identity matching circuit 32. Over the back contacts SR2, the tens and units leads in cable 32' are further extended to the right-hand tens and units digit registers 34 and 34' of matching circuit 32. In keeping with the simplified form of illustrating the effect of the operation of link 20 and preference lock-out circuit 22, adopted above in connection with the description of lead 17A, only those circuit paths pertaining to the explicitly depicted line finder auxiliary trunk circuit 8 are shown throughout. For example, contacts SR2 and SR3 of the PBX customer identity matching circuit 32 are those pertaining to the explicitly depicted line finder auxiliary trunk circuit 8. Contacts similar to these but pertaining to other line finder and trunk circuits are omitted from the drawing. The tens and units digits of the calling customers arbitrarily assigned identifying numbers, as indicated by the grounded conductors of cable 32', are stored in registers 34 and 34' which registers lock over the locking ground provided by back contacts of relay ML.

Sequence circuit 17 next operates sequence relay SR2 and releases sequence relay SR1. Release of relay SR1 removes positive potential provided by source 25 from the S lead of the calling subscriber's line while operation of relay SR2 at its left-most make contact continues through diode 24 the holding ground applied to the calling subscriber's sleeve. Relay SR2 at its break contact maintains the interruption of the switching train control circuit between lead S of the calling subscriber and lead Sa of the called subscriber and at its make contact applies the potential provided by source 25 to the Sb lead of called subscriber. Application of a positive potential to the Sb lead of the called subscriber at the right-hand side of circuit 8 causes a positive pulse to be transmitted through the Sb lead of cable 8b, selector control circuit 9a and cable 9c to the Sb lead of the connector control circuit 7a. In circuit 7a, the potential appearing on lead Sb is applied over the make contact of operated relay C0 to lead Sa and then to the next to the lowest one of the wipers W' to terminal S2a of connector terminal bank 7 which terminal S2a is associated with the called subscriber's station 1200.

While, for the sake of simplicity, the drawing shows that the called station 1200 and calling station 5000 have terminals appearing in the same connector bank, and while the sleeves of these stations are connected via leads 7s1 and 7s2 to the same identifier 27, no such restriction need be observed in practice. Thus, if the connector bank associated with the called subscriber is a different one than the connector bank associated with the calling subscriber, application of a positive potential to its terminal S2a will, via leads corresponding to leads 7s1 and 7s2 operate a line identifier corresponding to identifier 27. In either event, the line identifier will cause a ground potential to be applied to one of each of the TH, H and TN buses and accordingly the corresponding leads of cable 28 multipled to these buses.

Relay tree 31, in response to the grounding of one of each of the TH, H and TN leads in cable 28' in accordance with the called extension's number, will extend the ground appearing at its left-hand apex to one of the seven hundred code points, such as code point 31–699, appearing at its right-hand side. Grounding of code point 31–699 applies ground both to the terminus of lead TN–0 via cross-connection *p*–699 and to the terminus of lead U–9 via cross-connection *p'*–699 thereby indicating the called station 1200 belongs to a customer having the arbitrarily assigned identifying number 09. The grounds so applied are continued across the operated contacts of the connector 23 to matching circuit 32 where the information conveyed by the grounded leads is entered over the make contacts of operated relay SR2 into registers 35 and 35'.

AND gates 36 and 36' of circuit 32 are individually connected between the corresponding digit storage stages of registers 34 and 35, 34' and 35', respectively and will be operated only when the digits stored in these stages agree, as when the calling and called extension stations belong to the same customer—both registers then storing the same arbitrary identifying number. Simultaneous operation of AND gates 36 and 36' enables AND gate 37 which completes an operating path for relay ML. Relay ML operates and at its break contacts opens the locking paths for registers 35, 35', 34, and 34' which registers release the digits of the identifying numbers stored therein.

On the other hand, when the digits stored in the left and right-hand digit registers of matching circuit 32 are not in agreement, either or both of AND gates 36 and 36' will not be operated, and accordingly, AND gate 37 will not be enabled to operate relay ML. The tens and units digit designation of the calling PBX customer's arbitrary identifying number which is stored in registers 34 and 34' will not be released, and upon the operation of relay SR3 by sequence circuit 17, a ground seizure signal will be provided by matching circuit 32 over make contact SR3 and back contact ML to connector control lead 39'.

Connector 39, FIG. 2, is operated by the application of ground seizure signal to lead 39' and connects the tens and units digits output leads of register 34 and 34' appearing in cable 32'' to message register control 40. Message register control 40 contains a relay tree 41 which, in response to the energization of one of each TN and U leads in cable 32'', selectively extends an operating ground appearing at its left-hand apex to one of the hundred message register code points 41–0 to 41–99 appearing at its right-hand side. (One hundred message registers are assumed since the seven-hundred code points of the decoder relay tree 31, FIG. 1, were above assumed to have been distributed, as desired, among a hundred different PBX customers). Extension of the ground to a relay tree 41 code point scores a respective one of the message registers 42–0 through 42–99, thereby assessing the charge for the call against the customer from whose extension station the call was originated. The message registers 42–0 through 42–99 are accordingly advantageously located in the multicustomer office building.

*Outgoing local calls*

On calls made by any of the extension stations of the multicustomer PBX to customers located outside the multicustomer office building, the digit 9 will continue to be dialed as in present systems to obtain access to a central office trunk. Normal post springs associated with selector control circuit 9a apply a deactivating signal to lead 9b thereby preventing detector 16 from responding to supervisory signals which may thereafter be transmitted from the central office. When an idle one of the outgoing central office trunk circuits on the ninth level of selector 9, such as trunk circuit 10, has been selected and the dial at station 5000 has been operated a sufficient number of times to activate the originating switching system 51 of central office 50, a connection to the called telephone (not shown) will in a well-known manner be established by the central office 50. Considering first that a connection to a telephone within the local switching area is desired, originating switching system 51 would, as soon as the called party answered, normally apply a message register scoring signal to score a message register (not shown) that is connected to terminal MR associated with the incoming trunk line circuit.

Inasmuch as the illustrative embodiment permits as many as a hundred customers to be connected at different times through outgoing trunk line circuit 10 to central office 50, the connection of the usual message register to terminal MR would not provide for the accurate assessment of charges against the proper calling subscribers. Accordingly, the MR terminal of each trunk line circuit at the central office is connected by a lead such as lead 51–10 to a relay MRF at the multicustomer PBX. The message register scoring signal applied to terminal MR operates relay MRF at trunk line circuit 10. Operation of relay MRF at its make contact grounds lead *mr* of cable 10' which cable is connected to crossbar link circuit 52. The grounding of lead *mr* indicates to the link controlling circuit B (not shown in detail) that the link must request, via preference lockout circuit 22, access to the PBX customer identifier 30 (FIG. 1). Accordingly, the link controlling circuit B causes link 52 to extend a connection from the *mr* lead of cable 10' to lead *mr'* connecting crossbar link circuit 52 to preference lockout circuit 22. Assuming that preference lockout circuit 22 is not being addressed by energization of lead 17a', preference lockout circuit 22 will extend the continuity of lead *mr'* over the dotted portion thereof indicated within circuit 22 to connector 53 causing connector 53 to operate. Simultaneously with the completion of the continuity of the dotted portion of lead *mr'*, the circuit 22 activates OR gate 54 via its input lead 54a associated with lead *mr'*. Activation of OR gate 54 operates relay SI which at its make contact connects positive potential source 56 to lead S' connected to link circuit 52. The positive potential applied to lead S' is connected in link circuit 52 to the S lead of cable 10′. Positive potential appearing on the S lead of cable 10′ is connected at the cathode of diode 57 to the sleeve lead of cable 9d and finds its way back through the sleeve lead connections of the switching train to the terminal S1 in connector bank 7 associated with the terminals of the calling subscriber 5000 operating the identifying relays in identifier 27. In a similar manner to that described above, identifier 27 energizes one of each of the TH, H, TN and U leads of cable 28 and the energized leads are extended by cable 28′ and the normally closed contacts of connector 29 to the relay tree 31 of decoder identifier 30. Energization of one of each of the TH, H and TN leads to relay tree 31 effects the grounding of one of the code points 31–0 through 31–699 at its right-hand side in a similar manner to that described above for intercommunicating PBX calls. The grounding of one of the code points will in turn effect the grounding of one of each of the TN– and U– leads over the paths provided by jumpers p–, p′–, respectively. The grounds applied to the TN– and U– leads are extended via respective leads in cable 58 to connector 53 (FIG. 2) which, having been operated by the energized mr′ lead, connects each of the leads of cable 58 to the corresponding leads of cable 32″. The leads of cable 32″ which have become energized, operate relay tree 41 of message register controller 40 to extend a message register scoring ground to the particular one of message registers 42–0 to 42–99 belonging to the customer associated with the calling extension station.

*Outgoing toll calls*

An outgoing toll call proceeds in similar manner to that described above for an outgoing local call except that originating switching system 51 instead of applying a message register scoring signal to terminal MR applies an identification request signal between the tip and ring leads of the trunk line circuit. The identification request signal is detected by detector 60 at the PBX outgoing trunk line circuit and detector 60 applies an identifier access request signal to lead d of cable 10′. Application of an identification access request signal to lead d of cable 10′ causes the crossbar link control circuit B (not shown in detail) associated with crossbar link circuit 52 to connect the T, R, d– and SP leads of cable 10′ to CAMA outpulser 61 (FIG. 1) over cable 61′. CAMA outpulser 61 when seized by the activation of lead d of cable 61′ activates lead 61″ connected to preference lockout circuit 22. Preference lockout circuit 22 will extend the continuity of lead 61″ over its dotted portion (assuming that neither lead 17a′ nor mr′ is activated). Extension of the continuity of lead 61″ applies the activation potential applied thereto by CAMA pulser 61 to connectors 29 and 66 thereby operating them. Operation of connector 66 extends the TH, H, TN and U leads of cable 28 to the input 61a of CAMA pulser 61 and the operation of connector 29 opens its normally closed contacts interrupting the continuity of cable 28′ to prevent operation of relay tree 31.

Simultaneously with the completion of the continuity of lead 61″ by circuit 22, OR gate 54 is operated by activation of its input lead 54b associated with the dotted portion of lead 61″. Operation of OR gate 54 operates relay SI to apply the positive potential provided by source 56 to lead S′ associated with crossbar link circuit 52. In a similar manner to that described above in connection with the description of an outgoing local call, crossbar link circuit 52 continues the potential appearing at lead S′ to lead S of cable 10′ and trunk line circuit 10 continues the positive potential to the S lead of cable 9d. The identifiers 27 operated by the application of a positive potential to the sleeve terminal S1 associated with the calling subscriber's line terminals energize one of each of the TH, H, TN and U leads of cable 28 and operates appropriate pulse transmission relays (not shown) included within the CAMA pulser 61. The four-digit directory number designation furnished CAMA pulser 61 is transmitted by pulser 61 over the T and R leads of cable 61′ and the operated crosspoint of crossbar link circuit 52 to the T and R leads of cable 10′.

Simultaneously with the registration of the four-digit directory number designation in CAMA pulser 61, pulser 61 energizes lead SP of cable 61′ to operate relay SPT of trunk line circuit 10, the operating path for relay SPT extending from CAMA pulser 61 over cable 61′ and the operated crosspoint contacts of crossbar link circuit 52 over cable 10′ to the winding of relay SPT. Operation of relay SPT at its break contacts disconnects the T and R leads of the switching train cable 9d from the central office tip and ring terminals of the trunk line and connects the latter to the T and R leads of cable 10′. Accordingly, the pulses transmitted by pulser 61 are transmitted directly to the central office 50 where they may be recorded by automatic message accounting equipment (not shown) advantageously included as part of system 51. When CAMA pulser 61 has completed the outpulsing of the directory number digits of the calling extension station, lead SP of cable 61′ is deenergized allowing relay SPT to release, thereby restoring the continuity of the tip and ring leads between the calling extension station and the central office.

Accordingly, it is seen that line identifying equipment associated with the connector bank sleeve terminals of private branch extension stations may selectively be seized by identification request signals transmitted over an auxiliary trunk circuit in response to intercommunicating calls, or by an outgoing trunk circuit in response to outgoing local or toll calls, to obtain the identity of the PBX customer associated with the calling extension station. The calling customer's message register may then be seized in response to the identity so obtained or the identity may be encoded for transmission to the central office. On intercommunicating calls the identity of the calling and called stations is sequentially obtained after the called station answers by sequentially replacing the switch train holding grounds with identifying potentials directed toward the connector bank sleeve terminals of the calling and called stations. Advantageously, the same line identifiers associated with the connector bank terminals which are brought into operation on intercommunicating calls may be used also to provide customer identification on outgoing local calls and extension station designation digits on outgoing toll calls.

The foregoing system has been described for assessing charges against calling subscribers after the called station answers and without impeding the connection between calling and called subscribers. It is, however, entirely conceivable that restrictions may be desired to be placed against the completion of calls to certain extensions. In such case, a digit register and translator may be inserted in series with cable 8a for identifying restricted access codes. The digit register in response to the thousands, hundreds and tens digits of the called number would activate a code point similar to those of relay tree 31. These code points would be cross-connected to the TN– and U– leads of cable 32′ to enter directly into the registers 34, 34′ of PBX customer identity matching circuit 32 the customer identity digits of the called extension station. Thus these registers would store the identity of the called station directly from the dialed digits before the call was completed instead of storing the information provided by line identifiers 27 after the connection was completed. Matching circuit 32 would then be arranged to have additional contacts (not shown) of relay ML provide busy signal whenever the customer's identities of the calling and called subscribers do not match. In this event calls between extension stations not belonging to the same subscriber would have to be completed through the central office.

It is to be understood that the above descriptive arrangements are merely illustrative of the principles of this invention and various other arrangements may be devised by those skilled in the art without departing from the spirit and scope of the invention.

What is claimed is:

1. A private branch exchange telephone switching system comprising a plurality of extension stations, switching train means for selectively effecting connections among said extension stations, a control path extending between the switching train terminals of a calling and a called one of said extension stations, a telephone number identification requesting circuit, means responsive to the completion of a talking connection to a called extension for returning said control path through said switching train to said identification requesting circuit, means in said identification requesting circuit for maintaining a switch train holding condition on said control path, and means responsive to the said called extension station answering said call for selectively super-imposing identifying potentials over said control path toward said calling and called extensions, said control path having a first conductor along which a switch train controlling signal is advanced incident to the extension of said talking connection and a second conductor selectively connectable to said first conductor at said switching train terminals.

2. A private branch exchange telephone system in accordance with claim 1, wherein said means responsive to said called station answering said call includes means for transferring said switch train controlling signal from said first to said second conductor.

3. A private branch exchange telephone system in accordance with claim 1, wherein said means for selectively superimposing said identifying potentials includes means for applying one of said potentials over said second conductor toward said switching train terminals of said calling station and another of said potentials over said second conductor toward said switching train terminals of said called station.

4. A multicustomer private branch exchange having a common switching system, each customer comprising a plurality of extension station terminals, means connected with said terminals for obtaining the directory number designations of the extension stations associated therewith means for grouping said directory number designations into PBX customer identity code signals, means for comparing the customer identity code signals corresponding to calling and called extension station terminals, and means controlled by said comparing means for assessing charges against said calling extension when said calling and called customer identities are different.

5. A multicustomer private branch exchange according to claim 4 wherein said means for obtaining said directory number designations includes identifier means connected to the terminals of both said calling and said called extension stations and means for selectively activating said identifier means.

6. A multicustomer private branch exchange according to claim 5 wherein said means for selectively activating said identifier comprises switching means for controlling said customer identity comparing means.

7. A telephone switching system including a central office and a private branch exchange, said system comprising means for identifying the directory number designations of the extension stations of said private branch exchange, decoder means connectable to said number identifying means for identifying the chargeable customers associated with said stations, means including an outgoing trunk for extending a call from any of said stations through said central office, means at said central office for assessing charges against said trunk, and means at said private branch exchange responsive to the operation of said charge assessing means for operating said station identifying means.

8. A telephone switching system according to claim 7 wherein said central office trunk charge assessing means transmits to said private branch exchange signals individual to local and to toll calls.

9. A telephone switching system according to claim 8 wherein said private branch exchange further comprises outpulsing means and means selectively responsive to said individual signals for connecting said outpulsing means to transmit said directory number designations to said central office.

10. A telephone switching system according to claim 9 wherein said private branch exchange further comprises message register means and wherein said selectively responsive means connects said decoder means to said message register means.

11. A telephone switching system according to claim 7, wherein said private branch exchange comprises comparison circuit means and means for selectively connecting said decoder means to said comparison circuit means.

12. Apparatus for charging calls from groups of private branch exchange extension stations to the customers associated with said groups comprising means for obtaining the number designation of any calling one of said extension stations, means for obtaining the number designation of any called one of said extensions, means for extending a telephone call between any of said stations, and means responsive to the extension of said call for comparing said called and said calling number designations.

13. Apparatus in accordance with claim 12 wherein said number comparing means includes means for converting each of said extension station number designations to customer number designations.

14. Apparatus in accordance with claim 13 further comprising a plurality of message registers corresponding to the number of said groups of stations and means for controlling said message registers in accordance with said customer number designations.

15. A telephone switching system comprising a central office, a plurality of subscribers' substations, common switching means for effecting connections among said substations and between said substations and said central office, means for identifying substations belonging to the same subscriber, means controlled by said switching means responsive to the completion of a talking connection between two of said substations for operating said identifying means, message charging means, and means for actuating said message charging means responsive to said identifying means detecting that the calling and called substations belong to different ones of said subscribers.

16. In a multicustomer PBX telephone system, a plurality of extension substations, means for establishing connections between substations of the same customer and of different customers in said PBX, said establishing means having means for selectively obtaining the extension numbers of calling and called ones of said substations, and means controlled by said extension number obtaining means for assessing a charge for said connections between substations of different customers in said PBX but not between substations of the same customer in said PBX.

17. In a multicustomer PBX telephone system, the combination as set forth in claim 16 wherein said last mentioned means includes means for comparing at least a portion of the extension numbers of the called and calling substations.

References Cited by the Examiner

UNITED STATES PATENTS

| | | | |
|---|---|---|---|
| 2,490,036 | 12/49 | Deakin | 179—27 |
| 2,912,505 | 11/59 | Lomax | 179—7.1 |
| 2,947,817 | 8/60 | Harris | 179—7.1 |
| 3,087,020 | 4/63 | Harris | 179—18 |

ROBERT H. ROSE, *Primary Examiner.*

WALTER L. LYNDE, *Examiner.*